(12) United States Patent  (10) Patent No.: US 8,479,994 B2
Nahill et al.  (45) Date of Patent: Jul. 9, 2013

(54) INDIVIDUALIZED SCANNER

(75) Inventors: James Nahill, Turnersville, NJ (US); John A. Furlong, Woodbury, NJ (US); David Wilz, Sewell, NJ (US); Thomas Amundsen, Turnersville, NJ (US); Sarah Gloeckner, Mount Royal, NJ (US); Mark Hernandez, Bridgeton, NJ (US); Dwight Franz, Haddonfield, NJ (US); Shane Michael Edmonds, Monroeville, NJ (US); John Beiler, Lancaster, PA (US); James A. Cairns, Victor, NY (US); Glenn Alan Cavanaugh, New Egypt, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 13/232,065

(22) Filed: Sep. 14, 2011

(65) Prior Publication Data

US 2013/0062413 A1  Mar. 14, 2013

(51) Int. Cl.
*G06F 17/00* (2006.01)
*G06F 19/00* (2006.01)
*G06K 7/10* (2006.01)
*G02B 26/10* (2006.01)

(52) U.S. Cl.
USPC ............ 235/462.25; 235/462.14; 235/462.15; 235/462.45; 235/462.46; 235/462.49; 235/472.01; 235/472.02; 235/472.03

(58) Field of Classification Search
USPC ................................ 235/462.01–472.03, 454
See application file for complete search history.

(56) References Cited

U.S. PATENT DOCUMENTS

| | | | |
|---|---|---|---|
| 4,825,058 A * | 4/1989 | Poland | 235/462.01 |
| 5,837,986 A * | 11/1998 | Barile et al. | 235/462.01 |
| 5,900,613 A | 5/1999 | Koziol et al. | |
| 5,929,418 A | 7/1999 | Ehrhart et al. | |
| 6,616,049 B1 | 9/2003 | Barkan et al. | |
| 7,077,321 B2 | 7/2006 | Longacre, Jr. et al. | |
| 7,080,786 B2 | 7/2006 | Longacre, Jr. et al. | |
| 7,104,456 B2 | 9/2006 | Parker et al. | |
| 7,669,770 B2 * | 3/2010 | Wheeler et al. | 235/472.01 |
| 2003/0204711 A1 * | 10/2003 | Guess | 713/1 |
| 2004/0062438 A1 | 4/2004 | Jia | |
| 2007/0228137 A1 | 10/2007 | Bhella et al. | |
| 2007/0295813 A1 * | 12/2007 | Kotlarsky et al. | 235/454 |
| 2009/0172384 A1 * | 7/2009 | Anson | 713/2 |
| 2011/0067956 A1 * | 3/2011 | Hwang | 182/234 |

* cited by examiner

*Primary Examiner* — Tuyen K Vo
(74) *Attorney, Agent, or Firm* — Heslin Rothenburg Farley & Mesii P.C.

(57) ABSTRACT

A method of operating a reader system includes: providing a reader for reading information data carriers; an operator loading a configuration overlay onto the configuration settings of the reader upon successful logging, wherein the configuration overlay is specific to the operator; and reading information data carriers utilizing the configuration overlay.

17 Claims, 3 Drawing Sheets

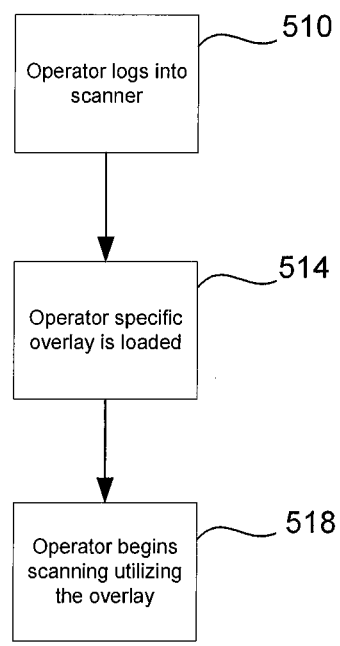

ISBN US 8,479,994 B2

INDIVIDUALIZED SCANNER

FIELD OF THE INVENTION

The present invention relates to reading devices, and more particularly to a reading device which may be individualized for an operator.

BACKGROUND

An exemplary information reading device for reading information bearing devices (IBDs) or information data carriers (IDC) that have data encoded or provided therein. An IDC may provide data from a number of sources, such as "flash" type memory, (e.g. a memory device sometimes known as "Multimedia MMC," "Smart Media," "Compact Flash," and "Memory Stick.", memory stick or drive; a command entered from the point of transaction system; a command from the local host or server; a magnetic stripe; a RFID device; wireless transmission device such as a BLUE-TOOTH™, a biometric from a person, etc. An exemplary reader may be an indicia bearing information (IBI) reader (also referred to as scanners, laser scanners, bi-optic reader, indicia readers, etc.) that reads data represented by printed or displayed IBI, (also referred to as symbols, symbology, bar codes, etc.) For instance one type of a symbol is an array of rectangular bars and spaces that are arranged in a specific way to represent elements of data in machine readable form. Indicia reading devices typically transmit light onto a symbol and receive light scattered and/or reflected back from a bar code symbol or indicia. The received light is interpreted by a processor which performs signal and/or image processing to extract the data represented by the symbol. Indicia reading devices typically utilize visible or infrared light. Laser indicia reading devices typically utilize transmitted laser light.

Exemplary readers used in a high-throughput point of transaction (POT) application typically falls into a category of scanners or indicia readers known as bi-optic scanners.

Efforts regarding such systems have led to continuing developments to improve their versatility, practicality and efficiency.

BRIEF DESCRIPTION OF THE DRAWINGS

FIG. 3 is an exemplary flowchart for operating a reader system.

DETAILED DESCRIPTION

Figure 1:
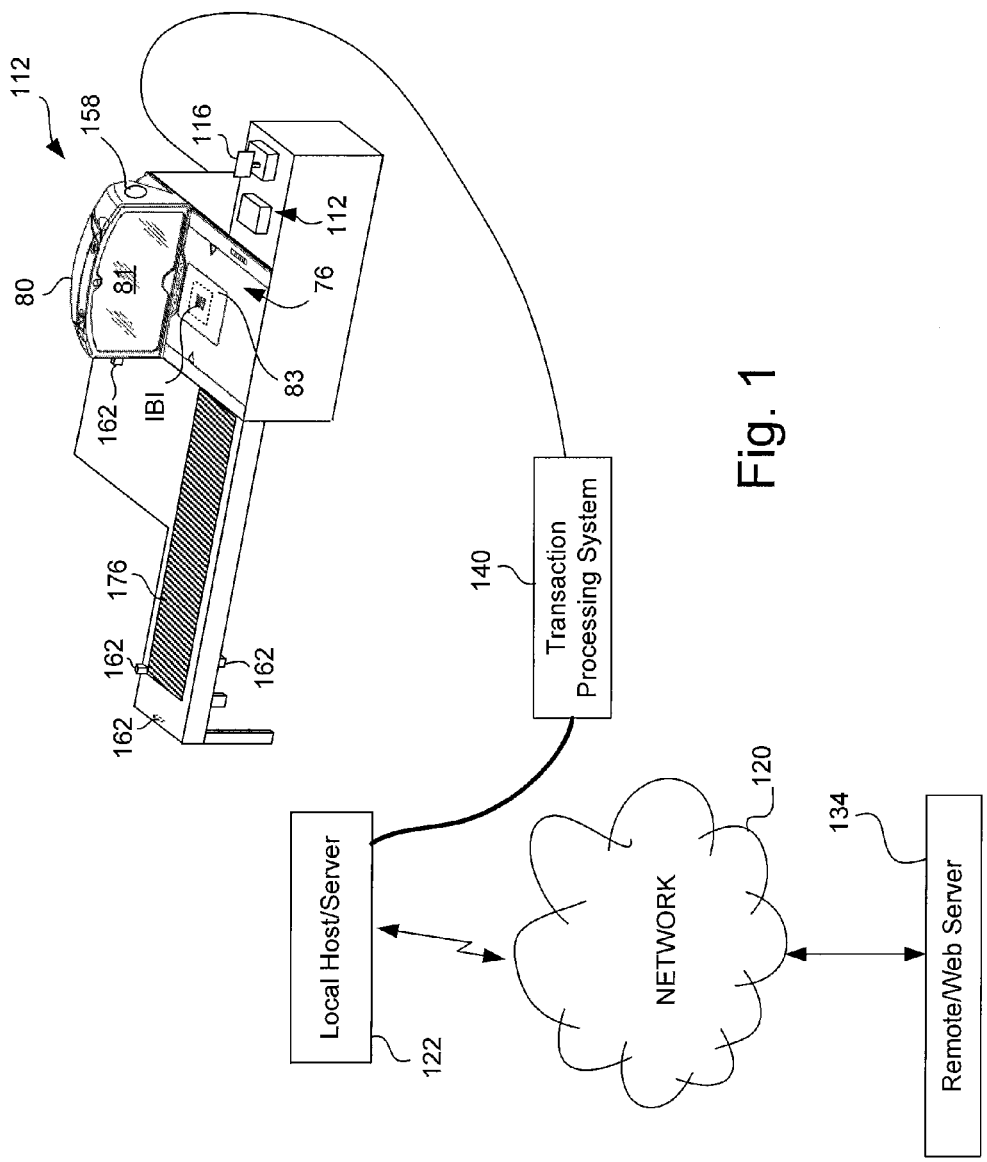
FIG. 1 is a block diagram of an exemplary reader system.

Reference will now be made to exemplary embodiments which are illustrated in the accompanying drawings. Other embodiments may be in various forms and the exemplary embodiments should not be construed as limited to the embodiments set forth herein. Rather, these representative embodiments are described in detail so that this disclosure will be thorough and complete, and will fully convey the scope, structure, operation, functionality, and potential applicability to those skilled in the art. Wherever possible, the same reference numbers will be used throughout the drawings to refer to the same or like parts. The term "read", "reading", "scan" or "scanning" used herein refers to reading or extracting data from information bearing devices (IBD) or information data carriers (IDC), such as a information bearing indicia (symbol or barcode).

IBIs may be disposed on a printed medium such as an employee identification, customer loyalty card, displayed on the display of a mobile device such as a cellular phone, portable data terminal, hand held indicia reader, etc.

Referring to the figures, an exemplary reader system configuration comprises one or more readers 112 operated by an establishment operator or operator and utilized where information data carriers (IDC) are present. Exemplary readers may be scanning systems such as bi-optic scanners, customer kiosks, optical indicia reading systems, RFID reading systems, biometric reading systems, magnetic stripe readers, etc.

Exemplary readers may receive and process information from a number of sources, such as "flash" type memory, (e.g. a memory device sometimes known as "Multimedia MMC," "Smart Media," "Compact Flash," and "Memory Stick.", memory stick or drive; a command entered from the point of transaction system; a command from the local host or server; magnetic stripe; RFID sensing system; wireless transmission systems such as a BLUETOOTH™, biometric sources, etc.

The term "biometrics" generally refers to automated methods of recognizing a person based on a physiological or behavioral characteristic. Among the characteristics that may be measured include; facial features, fingerprints, hand geometry, handwriting iris, retinal, vein, and voice. As such, the biometric sensor may comprise a finger print reader, an infrared imager, a microphone, a DNA analysis unit or a chemical analysis unit. It is to be noted that the image signal generating system may also be used as a biometric sensor by obtaining images of body parts (e.g. face, ear, retina, hand, profile, etc).

Exemplary readers may be in communication (wired or wireless) to a local transaction processing system 140, such as a cash register, customer station or employee station or local host/server 122 directly or through a charging station or base 138. An exemplary local server 122 or reader 112 may be in communication with network 120 and or a remote/web server 134.

An exemplary reader 112 may be used in an establishment such as a store at a point of transaction (POT) or point of sale (POS). An exemplary reader may include a centrally-positioned double-sided rotating mirror or central spinner, first and second deflectors or directional mirrors, first and second wobbling mirrors, and a plurality of pattern mirrors. The scanning system may be mounted in a housing 80, wherein patterns mirrors may be positioned and aligned to direct two scanning patterns in different directions towards a common scanning field. Exemplary bi-optic scanners may have an optics bench 76 that combines vertical and horizontal laser output windows 81, 83 respectively that view the common scanning field or region for reading IBI targets on products that may be located on the bottom or sides of the products.

An exemplary use of the exemplary reader is as the primary or sole reader at a customer point of transaction (POT) in an establishment. Primary may mean the reader at a POT is used to read IDC more often than any other reader at the POT. A transaction may be any of a number of events that occur between a customer and an establishment, such as a store. The events may involve such things as exchange of monetary funds, payment for merchandise or service, return of merchandise, picking up merchandise that has already been paid for, or contracting for a service (such as leasing or renting).

Figure 2:
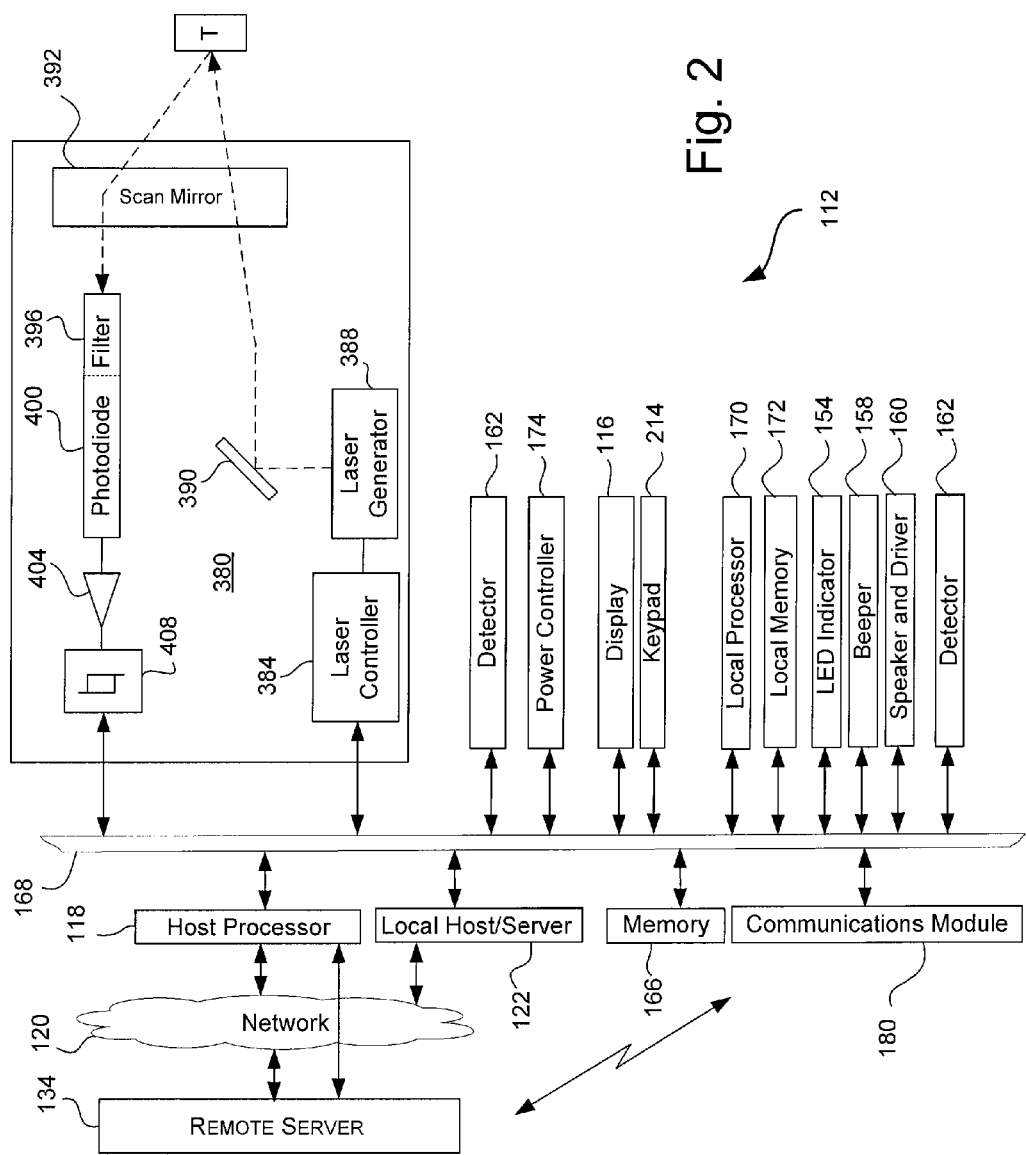
FIG. 2 is a simplified schematic block diagram of an exemplary reader system.

Referring to FIG. 2, an exemplary indicia reader 112 may be a scanner and comprise a number of exemplary subsystems, such as laser scan engine 380 or laser scanning reader system for reading indicia on a target T. The laser scanning reader system may comprise a laser controller 384 for controlling a laser generator 388 for generating a laser light beam which may be directed onto a folding mirror 390 which then directs the laser light beam to an oscillating or rotating scan mirror 392 to project a scanning pattern onto target T. The laser scanning pattern may be reflected off of the target and redirected by scan mirror 392 into a receive path comprising a laser light pass filter 396, a photodiode 400, an amplifier 404 and a digitizer 408.

Exemplary laser scanners use a laser beam as the light source and employ either a reciprocating mirror or a rotating prism to scan the laser beam back and forth across the IBI. One or more photodiodes are used to measure the intensity of the light reflected back from the bar code. The light emitted by the reader is rapidly varied in brightness with a data pattern and the photodiode receive circuit is designed to detect only signals with the same modulated pattern.

An exemplary photodetector or photosensor may be comprised of one or more photodiodes that converts incident light energy into electric charge that is an output signal representative of light reflected off an IBI. The output of the photodetector may be processed utilizing one or more functions or algorithms to condition the signal appropriately for use in further processing downstream.

Laser light may be described as a spatially coherent, narrow low-divergence beam of light. The output signal of the photodetector may be processed utilizing one or more functions or algorithms to condition the signal appropriately for use in further processing downstream, including decoding of IBIs.

An exemplary reader 112 my comprise one or more optical image engines (image indicia reader systems or optical scan engines) 414 for reading indicia on a target T. Optical image engines capture and read images to detect and decode IBIs located within the captured images. The optical image indicia reader systems may comprise one or more illumination source(s) 422 for illuminating an IBI with a beam or pattern of incoherent light in the form of an illumination pattern and a light receive circuit comprising an image sensor 432 for converting light reflected off a target T having an IBI provided thereon into representative output signals thereof. The output signal of the image sensor may be processed utilizing one or more functions or algorithms to condition the signal appropriately for use in further processing downstream, including decoding of IBIs.

An exemplary reader is provided both an optical image indicia reader and a laser scanner indicia reader, the activation of both readers being accomplished by an operator actuating a single trigger with multiple pulls.

The light receive circuit may utilize imaging optics to focus light on the image sensor 432. Illumination source 422 may comprise an illumination source and illumination optics.

An exemplary optical image indicia reader may have an aiming pattern generator 424 for transmitting an aiming pattern on the target to assist an operator to properly scan indicia on the target. The aiming pattern generator may comprise an aiming generator light source, an aiming aperture and aiming optics.

An exemplary image sensor converts light or other electromagnetic energy reflected off of a target and provides an output signal representative thereof. Image sensor may be an array of pixels adapted to operate in a global shutter or full frame operating mode such as a color or monochrome 2D CCD, CMOS, NMOS, PMOS, CID, CMD, back-illuminated, etc. solid state image sensor. The image sensor may contain an array of light sensitive photodiodes (or pixels) that convert incident light energy into electric charge. Solid state image sensors allow regions of a full frame of image data to be addressed.

Illumination and aiming light sources may comprise any light source to provide a desired illumination pattern at the target and may be one or more LEDs. Illumination and aiming light sources with different colors may be utilized. For example, in one such embodiment the image reader may include white and red LEDs, red and green LEDs, white, red, and green LEDs, or some other combination chosen in response to, for example, the color of the symbols most commonly imaged by the image reader. Different colored LEDs may be each alternatively pulsed at a level in accordance with an overall power budget.

Other exemplary reader subsystems or components supported by a housing may include one or more local or on board processor(s) 170, local memory 172, a battery 218, a display 116, a key pad 214 and a wireless communications module 180. The subsystems may communicate via one or more bus 168, data lines or other signal or data communication form. The indicia reader may communicate with one or more local processor(s) 118, a local host/server 122, local memory 166, network 120 or remote server host/server 134.

Other exemplary systems, subsystems or components for a reader system may include one or more processor(s) or controllers 170, local memory 172, a display 116, a key pad 214, a communications module 180, a beeper 158 for providing audio feedback or a speaker and speaker driver 160 for providing audio feedback, one or more detectors 162 and a power controller 174. The subsystems may communicate via one or more bus 168, data lines or other signal or data communication form. The reader may communicate with one or more host processor(s) 118, a local host/server 122, local memory 166, network 120 or remote server host/server 134 utilizing a communications module 180.

Communications module 180 may provide a communication link from reader 112 to other readers or to other systems such as a server/remote processor 134.

Exemplary detectors may be proximity detectors to detect the presence of a person or item, imagers for taking images of events or persons, motion detectors, audio detectors for detecting audio signals such as voice messages, etc.

The particulars of the functionality of the processor(s) and the reader may be determined by or based upon certain configuration settings or data which may be stored in firmware, remote or local memory.

An exemplary processor may be a mixed-signal array with on-chip controller devices designed to replace multiple traditional MCU-based system components with one single-chip programmable device. It may include configurable blocks of analog and digital logic, as well as programmable interconnects.

Exemplary functions of the processor(s) may be controlling operation of the scan engine, decoding functions and operator interface functions. Operating software may be utilized to operate the processor(s) for such functions seemingly simultaneously or in a multitasking role. An exemplary reader operating software architecture may be organized into processes or threads of execution.

Readers might encounter a myriad of errors, faults, problems or operational situations that causes the reader to misread an information bearing device (IDC), not read appropriate IDC or otherwise not function properly or operate in a manner the operator is expecting or operate in a suboptimal manner. Examples of such situations are: the reader fails to read an IDC; the reader is reading IDC too slowly; the reader is intermittent; reader performance is degraded, etc. For these and other situations or error conditions, the operator is not likely to know the source of the problem.

A beeper or sounder is an electroacoustic transducer that converts electrical energy into mechanical energy to emit a more limited volume, quantity and quality of sounds than a speaker. Beepers have less controllability than speakers. Beepers typically have an erratic output frequency response over a frequency range from 150 to 6000 Hz which drops off dramatically at 6000 Hz and is not suitable for providing audio feedback other than simple tones. A typical usage of a beeper is to provide audio feedback of a successful read or an error condition. If the beeper is used to indicate an error condition, only one error tone is used for every kind of error and therefore does not provide good feedback to the operator as to the cause of the error condition unless embedding the number of tones to identify the error.

In an exemplary embodiment, a reader is provided with an audio speaker driven by a programmable electrical audio signal wherein the reader stores audio messages within memory. A processor diagnoses or recognizes when the reader performance is less than optimal or an error condition exists and makes a determination of the cause for the less than optimal performance. Different error conditions or reader operational information would then cause the processor to send different audio messages to the speaker to be broadcast by the speaker to provide the operator with audio voice synthesized information regarding reader performance.

In an exemplary embodiment, alpha-numeric digit display devices may also relate the error in question by identifying numbers with documented error types.

In an exemplary embodiment, the mode of the reader may be adjusted to use the profile parameters in a learning mode in addition to operating with them. In this manner, operator profiles may be 'refined' during a learning period until enough information is gathered to make a 'stable' profile set of parameter adjustments.

In an exemplary embodiment, the speaker output volume is adjustable by the operator or automatically adjusted based on ambient noise. In an exemplary embodiment, speaker operational settings may be part of the configuration settings.

The following are exemplary audio messages in response to certain conditions. The list is not inclusive of all potential messages and conditions.

| Audio Message | Condition |
| --- | --- |
| No read reflection. | Scan failed due to specular reflection. |
| No read poor barcode. | Scan failed due to poor quality IDC. |
| Slow reading. | Scan decoding times are slower than optimum. |
| Barcode not enabled. | Scan failed because decoding of the IDC is not enabled. |
| Poor illumination. | Scan performance is degraded due to poor illumination. |
| No barcode in view. | The reader cannot detect an IDC in view. |
| Dirty window. | The transparent window on the reader is contaminated. |
| Barcode too far. | The reader can't read because it's too far from the IDC. |
| Barcode too close. | The reader can't read because it's too close to the IDC. |
| Barcode not recognized. | The Point of transaction terminal has related that the IDC is not representative of any products in its database. |
| Software update available. | A software update for the reader is available. |
| Overheating | The reader temperature is too high. |
| Not Centered | Only part of the Barcode is in view. |
| Tilt the barcode | Correction for a no read situation. |

In an exemplary embodiment, the operator is provided feedback or alerted from a combination of the audible message and a beeper sound or a LED indicator or a displayed message on a reader display.

In an exemplary scanning embodiment, the LED indicator may provide different colors illumination dependent on the type of condition being present. Different levels of performance may be determined and the LED indicator color may change depending on the level of reader performance. For example, the LED indicator may illuminate green when a scan is read and performance is optimal, illuminate yellow when reader performance is less than optimal but the reader is still operational and illuminate red if reader is not operational or will not read particular IDC.

In an exemplary scanning embodiment, the LED indicator may indicate to an operator that a specular reflection condition exists. The speaker may also broadcast the specular reflection audio message in conjunction with the LED indicator. Specular reflection is the process by which incident light is redirected at the specular (mirror) angle. Specular reflection occurs when light strikes a shiny or mirror-like surface and is reflected away at one angle referred to as the specular angle. The surface of many types of bar code symbols tend to have a shiny or specular surface causing a portion of the incident light from an indicia reader illumination source to be reflected back into receive optics. The intensity of this light may be significantly higher than the scattered light from the scattering surface of the indicia itself. The result is that the indicia may be locally obliterated by this specular reflection.

For an establishment, efficiency at moving items through a point of transaction (POT) system, such as a scanner and/or cash register is very important in sustaining low operating costs and high customer satisfaction. This throughput is often measured in the number of items correctly scanned with a bar code scanner on the first pass (known as a first-pass read rate (FPRR).

A reader in a high-throughput, POT application typically provides an operator only with feedback indicating a "Good Read". This feedback usually includes both an audible BEEP and a visual indicator such as a LED (light emitting diode) indication. These provide feedback to the operator indicating that a IDC placed in the read field was recognized, decoded and transmitted. This feedback provides very limited information. By providing the operator with additional information he/she can make adjustments in their reading action in order to improve the chance of reading subsequent articles on the first pass of the item.

In an exemplary embodiment, a message is broadcast only when reader performance is less than optimal or an error condition exists.

In an exemplary embodiment, positive feedback is provided when the operator successfully employs a scanner "sweet spot", where the spatial relationship between the scanner components and a barcode provide the most likelihood of a successful read.

In an exemplary embodiment, operators may be encouraged to improve their performance through motivational feedback incentive.

In an exemplary embodiment, the reader system provides an operator with real time, direct feedback of the rate of reading throughput to provide the operator with immediate indication of how efficiently they are operating the reader. Performance levels may be tracked by work shift, customer by customer, or other time period interval and stored for performance evaluation. Performance thresholds may be set in order to trigger documentation or feedback of achieved incentive levels for employee compensation. This may be used to teach an operator how to use the reader more efficiently, but also to motivate them to be more productive by their own means.

An exemplary form of motivational feedback may be for a scanner that has a numeric display that shows a higher number as productivity (throughput or speed) increases and drops off or decreases as they slow down. Another exemplary form may be a "bar graph" in the form of a string, row or array of LEDs, which may be multicolored and arranged in an aesthetically appropriate configuration. As the operator improves throughput, the bar may get longer. As each item is scanned the bar length (or number) would increase and would then slowly decay. The greater the scan rate exceeds the decay rate results in higher "scores", such as by displaying more LEDs in the string or changing the color of one or more LEDs or a higher number on a display. The score may be reset for each customer interaction, or could be kept running in order to motivate the operator to move quickly through the payment process.

In an exemplary embodiment, different metrics may be kept, such as the number of customer interactions where the score exceeded a certain number, a daily high score, average productivity per customer, etc.

In an exemplary embodiment, visual motivational operator feedback may be combined with an entertainment factor, such as music or sounds that indicate performance.

In and exemplary embodiment, an operator reads a first IDC, and then continues to scan a number X of IDCs. The time is measured on how long the operator took to scan the X number of IDCs and feedback is provided to the operator based on the time between scan 1 and scan X. This information may also be used to extract barcode quality and report the quality for use for feedback to the manufacturer of the product to improve the barcode for throughput reasons.

In an exemplary embodiment, a method of operating a reader comprises the steps of: consecutively reading a plurality of IDCs over a period of time; determining an operator of the reader's performance based on the rate at which the plurality of IDCs are being read over the period of time; and, providing feedback to an operator of the result of the determining step.

In an exemplary embodiment, a reader system comprises: a reader adapted for consecutively reading a plurality of IDCs over a period of time; a controller for determining an operator of the reader's performance based on the rate at which the plurality of IDCs are being read over the period of time; and providing feedback to an operator of the result of the determination.

In an exemplary embodiment, there are many parameters or configuration settings of an operator profile that may be collected and implemented to suit individual operators of a bi-optic scanner. These parameters may be configurable to adjust to an individual operator's preferences while using the scanner which may make the operator more comfortable using the scanner for increasing scanner performance if the configuration parameters used in scanning are optimized.

It is desirable to optimize throughput at a point of transaction, such as a cash register. Typical establishments have one configuration of all parameters being used for all the scanners. In an exemplary embodiment, overlays may be created for different operators. An "overlay" is a replacement block of stored instructions or data. In a general computing sense, overlaying means replacing a block of stored instructions or data with another. An exemplary overlay may contain configurable parameters and recognition of operator tendencies. Each overlay may preserve the basic operation of the scanner according to the desired installation, yet provide exemplary operator specific parameter adjustments to take advantage of desirable audible features, visual features and scanning tendencies of the operator to help increase scanner performance.

In an exemplary embodiment, in order to program a reader with an overlay for a particular operator, the operator may be identified utilizing information bearing devices such as a barcode specific to the operator; a memory stick or drive; a command entered from the point of transaction system, a command from the local host or server, magnetic stripe, biometric input, RFID sensing system, wireless communication such as BLUETOOTH™, etc.

A barcode may be disposed on an employee identification, customer loyalty card, displayed on the display of a mobile device such as a cellular phone, portable data terminal, hand held reader, etc.

The term "biometrics" generally refers to automated methods of recognizing a person based on a physiological or behavioral characteristic. Among the characteristics that may be measured include; facial features, fingerprints, hand geometry, handwriting iris, retinal, vein, and voice. As such, the biometric sensor may comprise a finger print reader, an infrared imager, a microphone, a DNA analysis unit or a chemical analysis unit. It is to be noted that the image signal generating system 1028 may also be used as a biometric sensor by obtaining images of body parts, e.g. face, ear, retina, hand, profile, etc.

Exemplary overlays to scanner configuration may include (but are not limited to) the following individual settings on top of the basic scanner configuration settings:

Beeper Volume to allow the operator to choose volume preference.

Beeper Tone to allow the operator a choice in beeper frequencies.

LED Selection to allow the operator to select which LEDS are utilized for scanning, laser activity and any other use of LEDS. On/Off selection of LEDs may not be desired and such control not be provided.

Beep on transmit of the scale weight to give feedback to the operator that a steady weight has been transmitted to the Point of transaction terminal. This positive feedback gives the operator confidence that the weighing action will be completed successfully.

Same Symbol Timeout for allowing the operator to synchronize to his scanning timing. Same Symbol Timeout comes into play during two phases of scanning. First, after an item is scanned but still in the scan field, the scanner will not transmit the item again until an amount of time (Same Symbol Timeout) has occurred where the scanner does not see the item anymore. Second, this timeout may be coordinated with the reality that an identical item is about to be scanned (same barcode, for example multiple cans of soup). In this case, the same symbol timeout parameter may be optimized for best throughput of this individual operator. The scanner can help 'learn' what that parameter(s) might be most effective for each operator.

Monitor the number of scans per line which may be used to shut down the lasers in certain areas of the scan field not typically used by the operator. Information about the number of scans per line may be used provide feedback to the operator about how well he is using the scanner and its features.

Monitor the number of scans per scan channel which may be used to shut down the lasers in certain areas of the scan field not typically used by the operator. Information about the number of scans per line may be used provide feedback to the operator about how well he/she is using the scanner and its features.

Monitor operator scan speed which may be used to provide feedback as to current capability or performance of the operator with respect to those of other operators or to show improved scanning capability or performance of the operator over time.

Monitor operator scan motion to alert the operator when scanning is not being done properly. As an example, operators are trained to drag items across the scale instead of using extra effort to completely lift the item to reduce fatigue. The facilitator to this is tracking the fact that the scale is off zero at the moment the item's IDC information is transmitted.

Automatically adjust outbound beam focus and focal length which may be adjusted to a favored operator scan distance. Operators will exhibit different ergonometric features based on such things as their physical size or attributes.

Automatically tilt or position the optics bench to a physical location preferred by the operator. This may be done to change the "sweet spot" used by each operator.

In self checkout lanes the operator is the customer. The system may be programmed to have configuration parameters for individual customers. Customer configuration parameters may be based on such things as a customer's physical characteristics, a customer's buying habits using such things as a customer convenience card to identify him/her.

In an exemplary embodiment, the system may be a customer service kiosk. An exemplary customer physical characteristic may be visual impairment wherein the system adapts audible and/or displayed feedback to accommodate the customer.

In an exemplary flowchart for operating a reader system illustrated in FIG. 3, an operator logs into a scanner in a step 510. An overlay specific to that operator is installed in a step 514. The operator then begins scanning in a step 518.

What is described herein is an exemplary method of operating a reader system comprising the steps of: providing a reader at a point of transaction; an operator loading a configuration overlay onto the configuration settings of the reader upon successful logging, wherein the configuration overlay is specific to the operator; and reading IDCs utilizing the configuration overlay.

What is described herein is an exemplary reader system comprising: a reader at a point of transaction; a controller adapted for: loading a configuration overlay onto the configuration settings of the reader upon successful logging, wherein the configuration overlay is specific to an operator; and reading IDCs with the reader utilizing the configuration overlay.

Perspective views of a transaction terminal according to the invention, which may be adapted for reading card information, for secure receipt of personal identification (PIN) information, for signature capture, and numerous other functions are shown in FIGS. 1a, 1b, and 1g. Card 90 which is processed by transaction terminal 10 may be, for example, a credit card, a debit card, customer loyalty card, an electronic benefits card, a company-sponsored benefits card, an identification card, etc.

Control circuit 210 may be in communication with other types of memory including "flash" type memory, e.g. a memory device 216F sold under the commercial names "Multimedia MMC," "Smart Media," "Compact Flash," and "Memory Stick." Flash type memory devices are especially useful for storing image data and signature data.

During operating programs executed by control circuit 210, a customer may actuate first imaging module 263-1 to, e.g., read a bar code from a customer loyalty card to determine a customer number, to capture an image corresponding to a fingerprint or a face of a customer, etc. A store clerk may actuate second imaging module 263-2 e.g. to read a bar code from a driver's license or other identification card to determine a customer's age, to read a bar code from a product, or to capture an image for any reason. Further aspects of the invention relating to a store clerk's actuation of second imaging module 263-2 will be described in greater detail herein.

The terminal may be disposed as a kiosk in a location where customers do business. When a customer interfaces with the kiosk or makes a transaction, terminal 10 may communicate transaction information to a network 400. Networks take on a variety of forms including a dial-up or cable modem interfaces, satellite connectivity, USB interfaces, ethernet interfaces including wireless and non-wireless which enable communication between devices.

It should be understood that the programs, processes, methods and apparatus described herein are not related or limited to any particular type of computer or network apparatus (hardware or software). Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa. The illustrated embodiments are exemplary only, and should not be taken as limiting the scope of the present invention. For example, the steps of the flow diagrams may be taken in sequences other than those described, and more, fewer or other elements may be used in the block diagrams. Also, unless applicants have expressly disavowed any subject matter within this application, no particular embodiment or subject matter is considered to be disavowed herein.

The invention claimed is:

1. A method of operating a reader system comprising the steps of:
    providing a reader in an establishment that reads information data carriers;
    an operator loading a configuration overlay onto configuration settings of the reader, wherein the configuration overlay is specific to the operator; and
    reading information bearing devices utilizing the configuration overlay;
    wherein loading the configuration overlay is accomplished utilizing at least one of (a) a barcode specific to the operator disposed on an identification card, (b) a barcode specific to the operator disposed on a customer loyalty card; (c) a barcode specific to the operator displayed on a display of a mobile device; (d) an RFID sensing system for identifying the operator; (e) a biometric input for identifying the operator.

2. A method of operating a reader system in accordance with claim 1, wherein a reader configuration setting comprises a beeper volume and/or a frequency setting.

3. A method of operating a reader system in accordance with claim 1, wherein a reader configuration setting comprises a light emitting diode (LED) selection.

4. A method of operating a reader system in accordance with claim 1, wherein a reader configuration setting comprises a weight reading on the reader.

5. A method of operating a reader system in accordance with claim 1, wherein a reader configuration setting comprises a read timeout setting.

6. A method of operating a reader system in accordance with claim 1, wherein a reader configuration setting comprises a setting of a number of scans per line.

7. A method of operating a reader system in accordance with claim 1, wherein a reader configuration setting comprises a setting of a number of scans per scan channel.

8. A method of operating a reader system in accordance with claim 1, wherein a reader configuration setting comprises a setting to monitor operator scan speed.

9. A method of operating a reader system in accordance with claim 1, wherein a reader configuration setting comprises a setting for a reader outbound beam focus and/or a reader focal length.

10. The method of claim 1, wherein loading the configuration overly includes utilizing (a) a barcode specific to the operator disposed on an identification card.

11. The method of claim 1, wherein loading the configuration overly includes utilizing (b) a barcode specific to the operator disposed on a customer loyalty card.

12. The method of claim 1, wherein loading the configuration overly includes utilizing (c) a barcode specific to the operator displayed on a display of a mobile device.

13. The method of claim 1, wherein loading the configuration overly includes utilizing (d) an RFID sensing system for identifying the operator.

14. The method of claim 1, wherein loading the configuration overly includes utilizing (e) a biometric input for identifying the operator.

15. The method of claim 14, wherein the biometric input includes facial feature recognition.

16. The method of claim 14, wherein the biometric input includes fingerprint recognition.

17. The method of claim 14, wherein the biometric input includes voice recognition.

* * * * *